(12) United States Patent
Henderson

(10) Patent No.: US 9,430,948 B2
(45) Date of Patent: Aug. 30, 2016

(54) LANDING ALERTS FOR PREVENTING RUNWAY EXCURSIONS

(71) Applicant: The Boeing Company, Chicago, IL (US)

(72) Inventor: Mark Henderson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 16 days.

(21) Appl. No.: 14/254,782

(22) Filed: Apr. 16, 2014

(65) Prior Publication Data

US 2015/0302753 A1 Oct. 22, 2015

(51) Int. Cl.
| | |
|---|---|
| *G08G 5/02* | (2006.01) |
| *B64F 1/18* | (2006.01) |
| *G01C 23/00* | (2006.01) |
| *G08G 5/00* | (2006.01) |

(52) U.S. Cl.
CPC . *G08G 5/02* (2013.01); *B64F 1/18* (2013.01); *G01C 23/00* (2013.01); *G08G 5/0021* (2013.01); *G08G 5/025* (2013.01)

(58) Field of Classification Search
CPC .... G08G 1/161; G08G 5/0086; G08G 5/025; G08G 5/00; G08G 5/02; G05D 1/0083; G05D 1/0607; G05D 1/0684; G05D 1/0676; B64C 25/00; B64C 13/10; G01S 1/02; B60T 8/1703
USPC ............. 701/5, 15, 16, 18, 70, 301, 121, 3; 340/945; 342/34
See application file for complete search history.

(56) References Cited

U.S. PATENT DOCUMENTS

| | | | | |
|---|---|---|---|---|
| 2,996,706 | A * | 8/1961 | Newell | G01S 1/02 244/185 |
| 3,096,433 | A * | 7/1963 | Daspit | G08G 5/025 244/175 |
| 4,058,710 | A * | 11/1977 | Altmann | G05D 1/0607 244/180 |
| 4,646,242 | A * | 2/1987 | Valaas | G05D 1/0083 244/111 |
| 8,165,735 | B2 * | 4/2012 | Constans | G08G 5/025 244/183 |
| 8,386,092 | B1 * | 2/2013 | Carrico | B64C 13/10 340/945 |
| 8,831,799 | B1 * | 9/2014 | Levine | G05D 1/0676 244/183 |
| 2004/0044446 | A1 * | 3/2004 | Staggs | G08G 5/025 701/16 |
| 2007/0142982 | A1 * | 6/2007 | Lorido | G08G 5/025 701/16 |
| 2009/0267798 | A1 * | 10/2009 | Goodman | G08G 1/161 340/945 |
| 2010/0274486 | A1 * | 10/2010 | Lorido | G08G 5/0086 701/301 |
| 2011/0066307 | A1 * | 3/2011 | Hiebl | G05D 1/0684 701/16 |
| 2011/0144875 | A1 * | 6/2011 | Rado | B60T 8/1703 701/70 |
| 2012/0232723 | A1 * | 9/2012 | Nance | 701/5 |
| 2013/0204470 | A1 * | 8/2013 | Luckner | G08G 5/025 701/18 |
| 2013/0261855 | A1 * | 10/2013 | DeGagne | G08G 5/0021 701/16 |
| 2014/0148980 | A1 * | 5/2014 | Le Corre | G08G 5/00 701/16 |

* cited by examiner

*Primary Examiner* — Yuri Kan

(74) *Attorney, Agent, or Firm* — Kolisch Hartwell, P.C.

(57) ABSTRACT

A landing alert system and method for preventing runway excursions may include determining, during an approach of an aircraft to landing on a runway, a target touchdown point on the runway, determining a boundary descent path configured to permit safe approach and touchdown of the aircraft on the runway at or before the target touchdown point, and, in response to the aircraft crossing within a selected margin of the boundary path, alerting an operator of the aircraft.

30 Claims, 4 Drawing Sheets

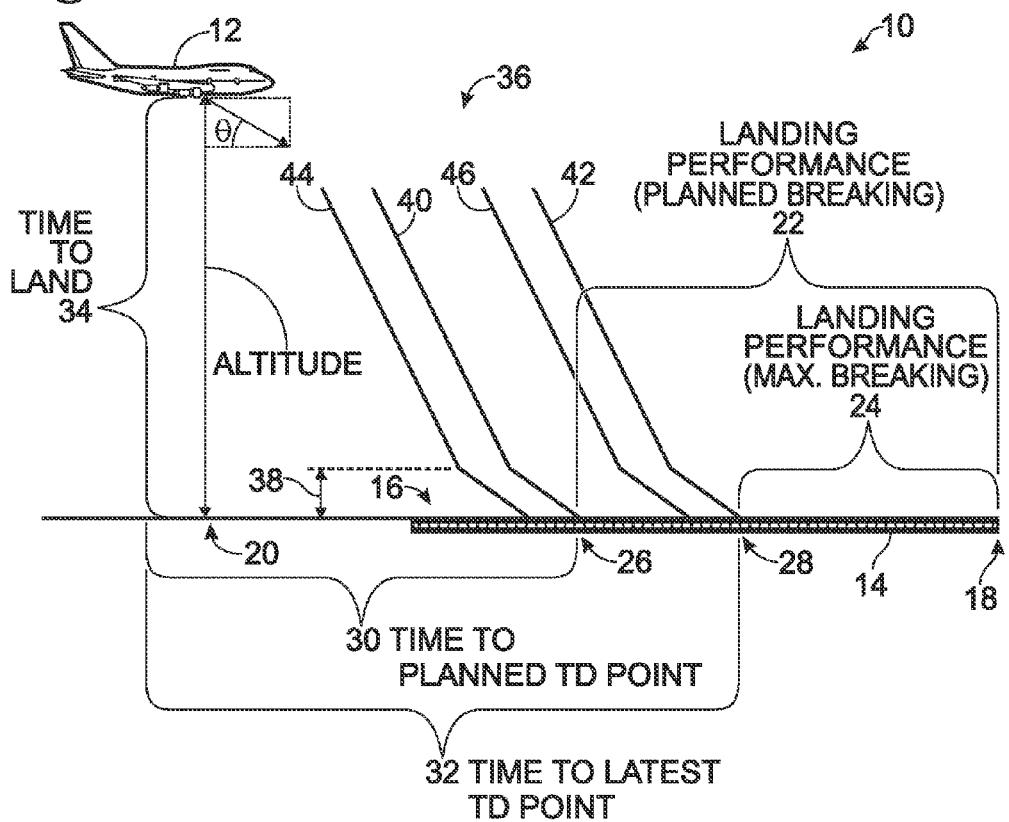
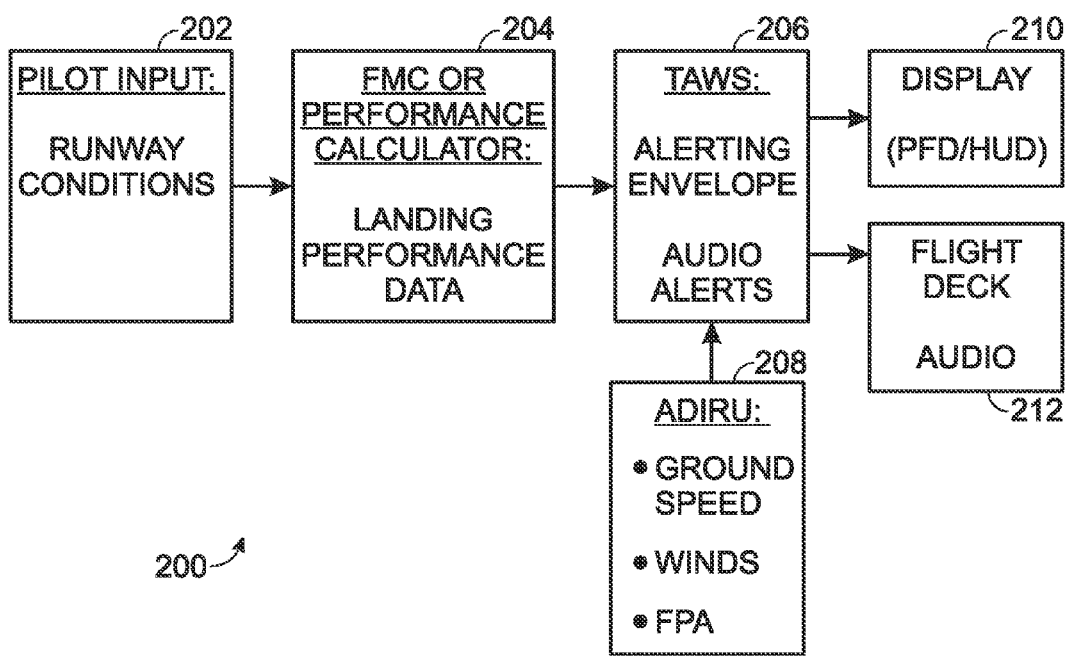

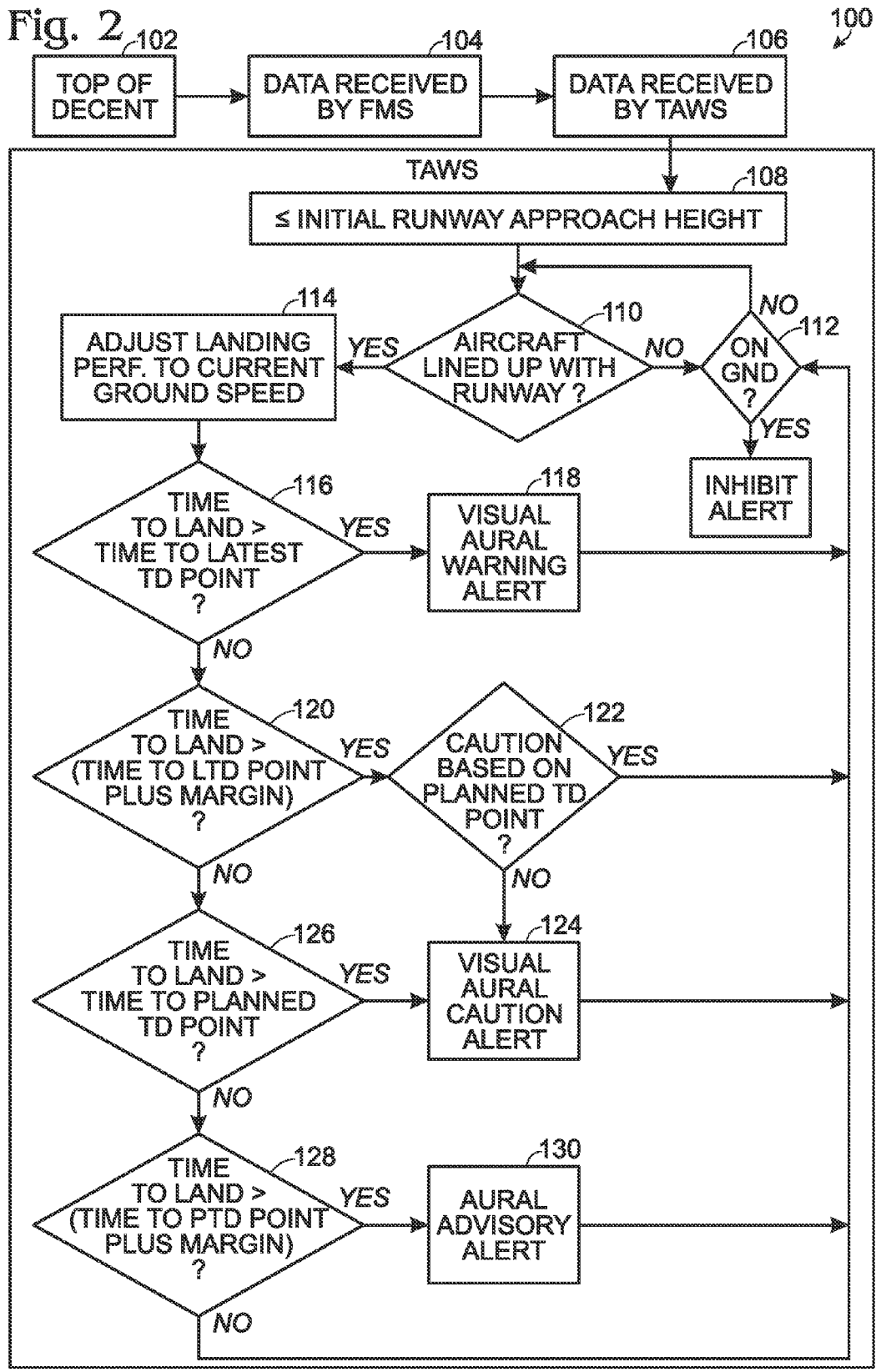

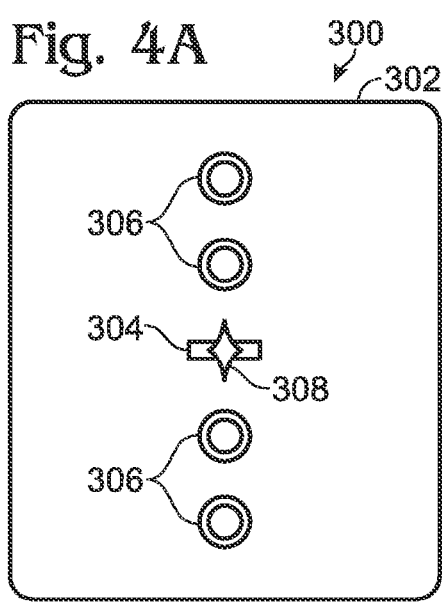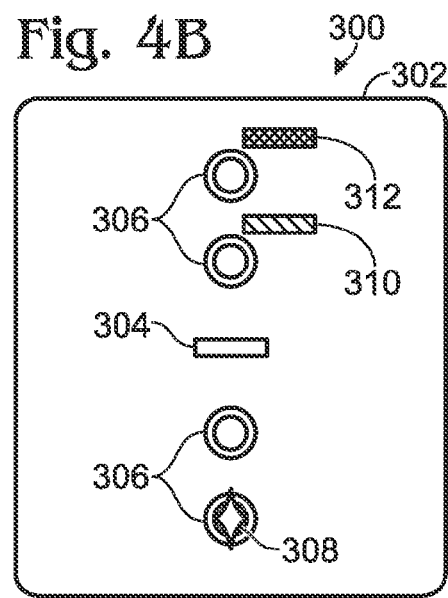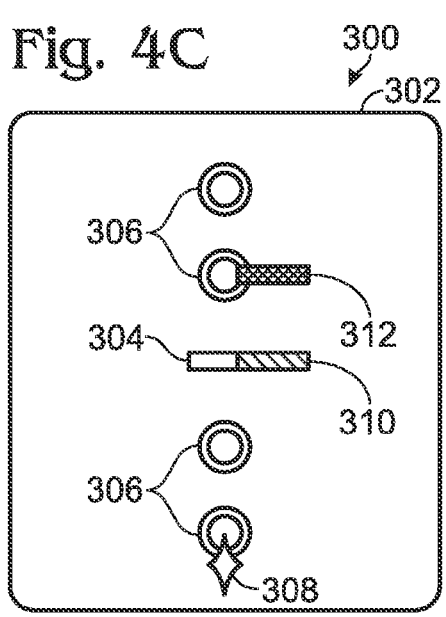

LANDING ALERTS FOR PREVENTING RUNWAY EXCURSIONS

CROSS-REFERENCES

The following related applications are incorporated herein, in their entireties, for all purposes: U.S. patent application Ser. No. 13/780,715.

FIELD

This disclosure relates to landing assistance systems for aircraft. More specifically, the disclosed embodiments relate to systems and methods for improving safety during the landing phase of a flight.

BACKGROUND

Aircraft, particularly fixed wing airplanes, usually end any given flight by landing on an elongate runway. Pilots typically calculate the amount of runway distance needed for safe landing of the aircraft based on information from the flight management computer (FMC) and planned approach information, as well as from information from the ground controllers regarding runway conditions. The pilot then uses instruments, experience, and judgment to determine where to safely touch down on the runway. Runway excursions, where an aircraft fails to stop safely on the available runway, are a constant concern. These incidents may be caused by landing when runway conditions and/or aircraft energy will not allow the aircraft to stop using all available means of deceleration. Methods and systems are needed to assist pilots in this regard with safe completion of the final approach phase of a flight. Ideally, these methods and systems would be straightforward to implement, even in existing data processing systems located onboard current aircraft.

SUMMARY

The present disclosure provides a computer-implemented method of assisting with landing of an aircraft, the method comprising determining, during an approach of an aircraft to landing on a runway, a target touchdown point on the runway, the target touchdown point being calculated to permit stopping of the aircraft before reaching an end of the runway. A boundary descent path configured to permit safe approach and touchdown of the aircraft on the runway at or before the target touchdown point may then be determined. In response to the aircraft crossing within a selected margin of the boundary path, an operator of the aircraft may be alerted. In some embodiments, a method may include determining, during an approach of an aircraft to landing on a runway, a latest touchdown point on the runway based on aircraft characteristics and current landing conditions, the latest touchdown point being calculated to permit stopping of the aircraft before reaching an end of the runway. A computer processor may compare an estimated minimum time (T1) to land the aircraft versus an estimated time (T2) to reach the latest touchdown point, and alert an operator of the aircraft when T1 is projected to be within a specified margin of T2. In some embodiments, a computer system for assisting with landing of an aircraft may include a processor; a memory in communication with the processor; and a landing alert program including a plurality of instructions stored in the memory that are executed by the processor to do the following: determine, during an approach of an aircraft to landing on a runway, a latest touchdown point on the runway, the latest touchdown point being calculated to permit stopping of the aircraft before reaching an end of the runway; compare an estimated minimum time (T1) to land the aircraft versus an estimated time (T2) to reach the latest touchdown point; and alert an operator of the aircraft when T1 is projected to be within a specified margin of T2. The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is an illustration showing a schematic side elevation view of an aircraft approaching a runway, with various aspects and dimensions relating to an illustrative landing alert system according to aspects of the present disclosure.

FIG. 2 is a flow chart depicting operations performed by one embodiment of a landing alert system according to aspects of the present disclosure.

FIG. 3 is a schematic diagram showing relationships between components in an illustrative landing alert system according to aspects of the present disclosure.

FIGS. 4A-4C are illustrations depicting three different illustrative states of an exemplary display for visually indicating information related to a landing alert system according to aspects of the present disclosure.

DESCRIPTION

Overview

Figure 5:
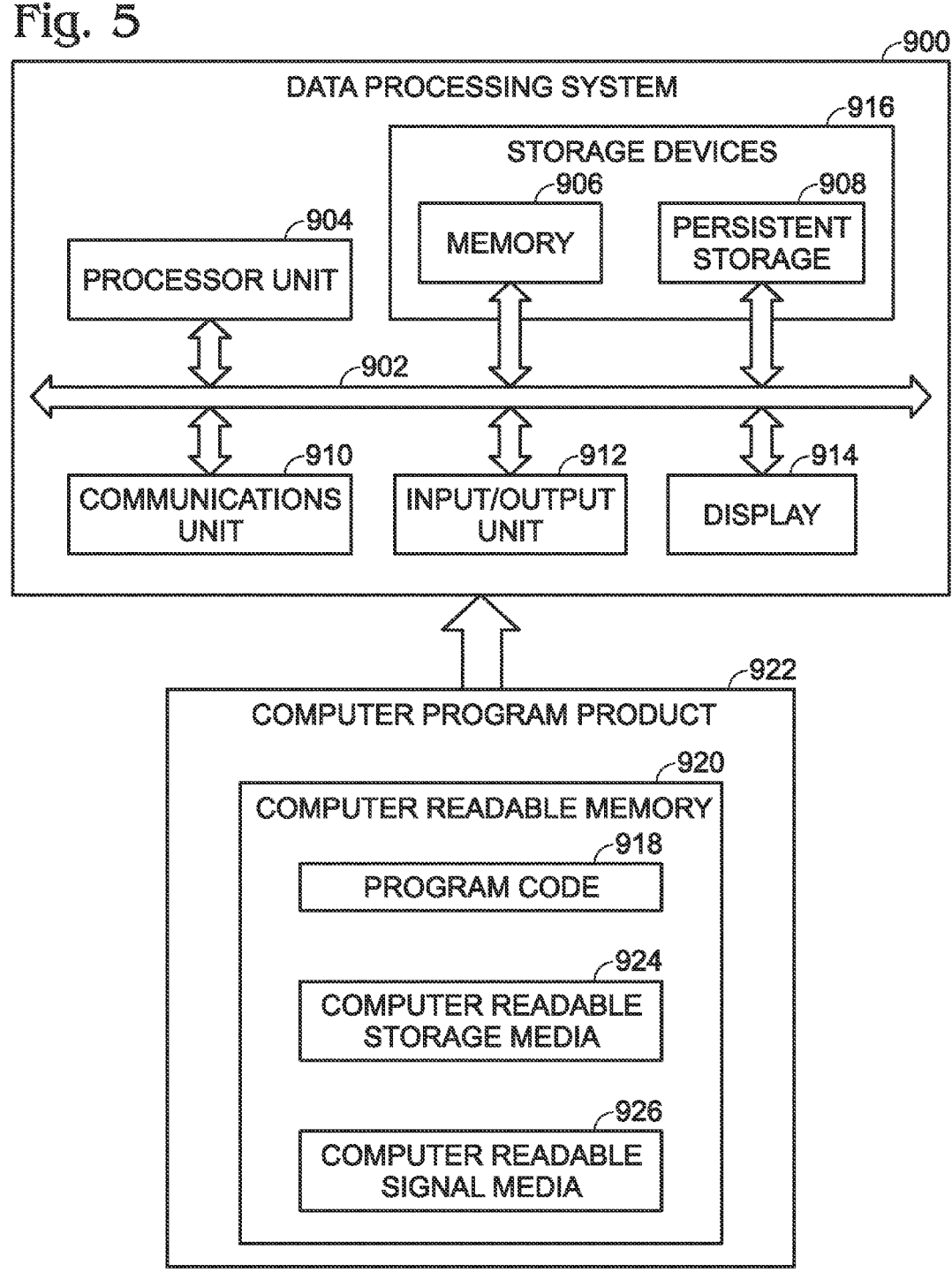
FIG. 5 is a schematic diagram of an illustrative data processing system suitable for use with a landing alert system according to aspects of the present disclosure.

Various embodiments of a landing alert system and method for preventing runway excursions are described below and illustrated in the associated drawings. Unless otherwise specified, the landing alert system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the landing alert system may, but are not required to, be included in other alert systems and processes. The following description of various embodiments is merely exemplary in nature and is in no way intended to limit the invention, its application or uses. Additionally, the advantages provided by the embodiments, as described below, are illustrative in nature and not all embodiments provide the same advantages or the same degree of advantage.

A landing alert system for preventing runway excursions may be generally described as a computer-implemented process in which the altitude and ground speed of an aircraft are analyzed in relation to one or more touchdown points on a runway. A time to land the aircraft is determined based on a predetermined maximum rate of descent from the current altitude. A time to reach each of the one or more touchdown points on the runway is also determined based on the ground speed and geographical distance to each touchdown point. The time to land is then compared to the time to reach a touchdown point, and the aircraft operator is alerted if the time to land exceeds the time to reach the touchdown point. In some examples, the operator is also alerted earlier, such as in response to the time to land coming within a predetermined margin of the time to reach a touchdown point.

An aircraft may include any suitable type of aircraft, such as a passenger aircraft, a cargo aircraft, a military aircraft, a drone, a fixed wing airplane, helicopter, sea plane, military jet, or any other type of aircraft. An aircraft may be operated by an airline or other commercial entity, a military unit or any other government entity, or any other public or private entity. Furthermore, an aircraft may be manned or unmanned. If the aircraft is manned, it may be controlled by one or more operators onboard the aircraft. If the aircraft is unmanned, one or more operators may control the aircraft from a remote location, i.e., not onboard the aircraft.

Similarly, a runway may include any suitable landing strip, pad, area, or surface having a boundary beyond which landing of an aircraft is undesirable or unsafe. The landing surface may be on land, on water, and/or on another craft such as on the flight deck of an aircraft carrier. A runway may include a typical paved runway at a commercial airport. The runway may have a length and a width, and may be generally planar. The runway may have two opposing ends, either of which may be designated as the end of the runway, possibly interchangeably depending on a desired direction of landing of the aircraft. In some examples, the end of the runway may be a designated point or region, and may not necessarily indicate the physical end of the runway surface. This may be the case, for example, when multiple runways overlap or are joined by interstitial paved surfaces.

A landing alert system in accordance with aspects of the present disclosure may be implemented in data processing system, as described further below. In some examples, a landing alert system may be implemented, at least in part, in existing aircraft computer systems. For example, an onboard terrain awareness warning system (TAWS) may be programmed to carry out process steps associated with a landing alert system according to aspects of the present disclosure.

DEFINITIONS

"Airspeed" is the speed of an aircraft in flight relative to the air around the aircraft. If the airspeed of an aircraft is too low, the aircraft may stall. An airspeed that is too high during cruise flight of the aircraft may cause flutter. An airspeed that is too high during an approach to landing may cause damage to the aircraft flaps or other aircraft systems.

"Ground speed" is the speed of an aircraft with respect to the ground or water over which the aircraft is flying. At certain times during the operation of an aircraft, it may be desirable that the ground speed of the aircraft is not too high or too low. For example, the ability of an aircraft to fly through wind shear conditions may be reduced if the ground speed of the aircraft is too low during an approach and landing operation. If the ground speed of an aircraft is too high during approach and landing, the aircraft may land beyond the end of the runway, or may land at a position on the runway and with such speed that it may be difficult to stop the aircraft before the aircraft reaches the end of the runway.

"Flare" refers to the change in attitude of an aircraft as it reaches a final landing phase and brings the nose of the aircraft up to orient the landing gear to properly contact the landing surface. This phase is typically performed at a predetermined altitude, and the angle of descent of the aircraft is typically shallower during the flare phase than during the immediately previous approach phase.

Specific Examples, Major Components, and Alternatives

Example 1

This example describes an illustrative landing alert system 10 having a plurality of alerts corresponding to one or more landing points; see FIG. 1.

In this example, an aircraft 12 may approach a runway 14 on which the aircraft is expected to land, the runway having a beginning or threshold 16 and a terminus or end 18 opposite the threshold. As described above, these two endpoints of the runway may be interchangeable depending on the desired approach, and may be virtual or designated points rather than physical endpoints. Aircraft 12 will have a geographic position 20, which corresponds to a point on the ground or water above which the aircraft is currently located. A relationship between position 20 of aircraft 12 and a second position on the ground may correspond to the horizontal distance between the aircraft and that second position. Similarly, the ground speed of the aircraft may be used to determine a length of time for the aircraft to travel between the two points. Accordingly, the time for aircraft 12 to travel between a known current location at point 20 and any given location on runway 14 may be determined or estimated by dividing the ground speed of the aircraft by the distance between the two points. This estimate assumes that ground speed will remain constant, and is accurate insofar as that assumption is met or the calculation is updated.

Aircraft such as aircraft 12 typically have known or predictable stopping capabilities depending on such factors as braking capacity, landing gear characteristics, runway conditions, wind speeds, and the like. Typically, one or more stopping distances for an aircraft are determined based on current conditions at least in part provided by an operator and corresponding to desired modes of braking. For example, a computer system may determine various stopping distances based on amount and types of braking used, up to and including maximum braking capabilities of the aircraft. Generally, braking of the aircraft is performed at a reduced rate to minimize stress on aircraft components and contents, such as passengers. Braking mode may be selectable by an operator, and may be changeable based on updated conditions or user choice. A braking mode that is selected by an operator, or by a computer system or controller, may be referred to as a planned braking mode.

Based on the planned braking mode, a planned stopping distance 22, also referred to as a planned landing performance, may be determined based on known and predictable aircraft performance capabilities. Because planned stopping distance 22 also takes into account real-time factors such as runway conditions and wind speeds and directions, planned stopping distance 22 may change over the course of a landing event, and may be updated dynamically by a computer system. In some examples, factors such as runway condition may be categorized. For example, runway condition may fall into predefined categories such as excellent, good, fair, poor, and the like. In these examples, a discrete value may be assigned to each category in order to include the condition in a stopping distance calculation. In some examples, runway conditions may be determined experimentally or empirically, for example by determining a coefficient of friction of the runway just prior to a landing event. In those examples, an actual observed data point from a substantially continuous set of possible values may be used in calculating a stopping distance. Similarly, a minimum stopping distance 24, also referred to as minimum landing performance, may be determined based on the same factors but assuming maximum braking is applied.

A latest landing point, also referred to as a latest touchdown (LTD) point, may be determined corresponding to planned landing performance 22 and/or minimum landing performance 24. A planned LTD point 26 may correspond to the point on runway 14 that is at planned stopping distance 22 from runway end 18. Likewise, a maximum braking LTD point 28 may correspond to the point on runway 14 that is at minimum stopping distance 24 from runway end 18. Because these LTD points each correspond to a location where the only remaining space before reaching the end of the runway is the stopping distance, each LTD point may be thought of as the last point where the aircraft can touch down and still stop on the runway using the selected mode of braking.

As described above, a time for aircraft 12 to reach the now known planned LTD point 26 and/or maximum braking LTD point 28 may be determined based on current geographical position 20 and current ground speed. Accordingly, a time 30 to reach planned LTD point 26 and a time 32 to reach maximum braking LTD point 28 may be calculated, such as by a computer system or processor.

Aircraft 12 may have an actual first rate of descent, interchangeably referred to as vertical speed, during the approach to a runway, which will typically be significantly more gradual than a maximum allowable or safe rate of descent. Additionally, a second rate of descent will be carried out during the flare phase of the landing, typically more gradual than the first. The aircraft altitude and these combined rates of descent will in reality correspond to a length of time the aircraft takes to reach the ground. However, hypothetical maximum rates of descent may be used to determine a minimum length of time for the aircraft to reach the ground. This hypothetical minimum length of time may be referred to as a minimum time to land, indicated at 34 in FIG. 1. In some examples, hypothetical maximum rates of descent may correspond to alarm conditions or any other suitable maximum allowable or desirable rate of descent.

Curves generally indicated at 36 on FIG. 1 correspond to boundary conditions or boundary descent paths for reaching certain points on runway 14 at the hypothetical maximum descent rates described above. As indicated, the maximum rate of descent above expected flare altitude 38 is higher than the maximum rate of descent below flare altitude 38. More specifically, path or curve 40 illustrates a boundary descent path configured to reach planned LTD point 26, and path or curve 42 illustrates a boundary descent path configured to reach maximum braking LTD point 28. Similarly, an offset boundary descent path may be desirable in order to provide an alert to the operator prior to an actual boundary condition. Accordingly, path or curve 44 illustrates an advisory-alert boundary descent path offset from and parallel to path 40, and path or curve 46 illustrates a caution boundary descent path offset from and parallel to path 42.

Curves 36 are boundary descent paths configured to permit safe approach and touchdown of aircraft 12 on the runway at or before the corresponding target LTD point, and system 10 is configured to alert the operator in response to aircraft 12 crossing one of these boundary paths.

System 10 may determine whether aircraft 12 is at or beyond one of the boundary paths by performing a comparison between minimum time to land 34 and time 30 to reach planned LTD or time 32 to reach maximum braking LTD. For example, if minimum time to land 34 (based on altitude and maximum descent rates) is greater than or equal to time 30 to reach planned LTD (based on ground speed and distance to planned LTD), the operator would be alerted that the aircraft will miss the planned LTD point and touch down with insufficient available runway distance with respect to the planned braking mode. Likewise, if the minimum time to land is greater than or equal to the time to reach maximum braking LTD, the operator would be alerted that safe landing is no longer possible. Similarly, system 10 may alert the operator with a caution or advisory if a comparison shows that aircraft 12 is within a predetermined margin of one of the conditions just described. For example, if minimum time to land is within 10 seconds of the time to reach planned LTD, the operator may be advised of that fact.

Example 2

This example describes an illustrative method 100 for providing landing alerts to prevent runway excursions; see FIG. 2.

FIG. 2 is a flowchart illustrating operations performed by one embodiment of a landing alert system, and may not recite the complete process or all steps of the program. FIG. 2 depicts multiple steps of method 100, which may be performed in conjunction with landing alert systems and methods according to aspects of the present disclosure. Although various steps of method 100 are described below and depicted in FIG. 2, the steps need not necessarily all be performed, and in some cases may be performed in a different order than the order shown.

Step 102 includes determining that the associated aircraft is at the top of an expected descent path during a landing event. In step 104, data may be received, such as by a flight management system (FMS) or flight management computer, corresponding to planned braking performance, maximum manual deceleration performance, airspeed correction values, and/or the like. Some or all of this information may be input by an operator. Step 106 includes receiving data at the TAWS corresponding to the FMS data, ground speed, such as from the inertial reference unit of the aircraft, and position to runway, such as from a runway awareness advisory system (RAAS).

Step 108 includes determining that the aircraft is at or below an initial runway approach height or altitude (also referred to below as $ALT_{Approach}$). This height may be predetermined, and/or may be determined by aircraft type. If the aircraft is determined to be at or below the initial runway approach altitude, step 110 includes determining whether the aircraft is lined up with the runway. If not, step 112 includes determining whether the aircraft is on the ground, in which case alerts are inhibited. If the aircraft is not on the ground, the method may wait at step 110 until the aircraft is either aligned or on the ground. Once the aircraft is determined to be in the air and aligned with the runway, step 114 includes adjusting landing performance (i.e., stopping distance) based on then-current ground speed of the aircraft.

At this point in process 100, comparisons are carried out between the minimum time to land and the time to a given target landing point (LTD point) as described above. More specifically, minimum time to land 34 may be calculated using the following equation.

$$\text{Time to Land}_{MIN} = \left\{ \frac{\text{MAX}((ALT_A - ALT_F), 0)}{VS_{MAX}} + \frac{\text{MIN}(ALT_F, ALT_A)}{\frac{ALT_F}{T_F}} \right\} \quad \text{Equation 1}$$

Here, minimum time to land 34 (Time to Land$_{MIN}$) is determined by adding two fractions or terms: (a) the time to descend between current or actual altitude (ALT$_A$) and flare height (ALT$_F$) (i.e., the leftmost fraction or term); and (b) the time to descend between flare height and the runway (i.e., the rightmost fraction or term).

The leftmost fraction in Equation 1 corresponds to the time to pass from ALT$_A$ to ALT$_F$. Specifically, the numerator is equivalent to the maximum of zero and the difference between ALT$_A$ and ALT$_F$. This numerator term is therefore the height of the aircraft above ALT$_F$ until ALT$_A$=ALT$_F$, at which point the term becomes zero. The denominator of the leftmost fraction of Equation 1 corresponds to a maximum allowable or maximum desired descent rate, also referred to as vertical speed (VS$_{MAX}$). This value will be predetermined and/or calculable depending on such factors as actual altitude, aircraft type, and/or aircraft characteristics. In some examples, VS$_{MAX}$ may be a constant. In some examples, VS$_{MAX}$ may vary when the aircraft is between an approach altitude and the flare height, based on an equation such as the following:

$$VS_{MAX} = \left(\frac{ALT_A - ALT_F}{ALT_{Approach} - ALT_F}\right) \times \left(VS_{MAX_{Approach}} - VS_{MAX_F}\right) + VS_{MAX_F} \quad \text{Equation 1A}$$

Here, the maximum vertical speed (VS$_{MAX}$) varies continuously within a range bounded by two constants: a maximum vertical speed at the approach altitude (VS$_{MAX_{Approach}}$) and a maximum vertical speed at the flare altitude (VS$_{MAX_F}$). As shown in Equation 1A, the maximum vertical speed in this embodiment varies as a sort of interpolation based on the altitude of the aircraft within the approach-to-flare window.

Regardless of whether Equation 1A or some other suitable method is used to determine VS$_{MAX}$, dividing the numerator of Equation 1, which is a vertical distance above flare height, by the denominator, which is a maximum vertical speed, results in a time to pass between current altitude and flare height.

The rightmost fraction in Equation 1 corresponds to the time to pass from flare height (ALT$_F$) to the ground (i.e., altitude of zero). Specifically, the numerator is equivalent to the minimum of the flare height (ALT$_F$) and the current actual altitude (ALT$_A$). This means that the numerator term will be set to flare height until actual altitude reaches flare height, after which the numerator will equal the actual altitude. The denominator of the rightmost fraction of Equation 1 corresponds to the rate of descent during the flare phase. In some examples, this rate of descent may be set to a maximum allowable or maximum desired vertical speed, as in the leftmost fraction. In the example shown, the rate of descent in the denominator of the rightmost fraction is set to the flare height (ALT$_F$) divided by the expected time to land after reaching flare height (T$_F$). In other words, the brief flare phase has an expected rate of descent, and that expected rate of descent is used as the denominator in this example. Accordingly, dividing the numerator, which is the actual altitude remaining in the flare phase, by the denominator, which is the expected rate of descent during the flare phase, results in a remaining time to reach the ground during flare phase. If the flare phase has not yet been reached, that remaining time will be equivalent to the full time it takes to pass from flare height to the ground.

Adding these two times together results in the minimum time the aircraft can be expected to take to reach the ground from the current actual altitude.

In another embodiment, additional information may be used to further enhance the calculation of Equation 1. For example, a flight path angle (FPA) θ of the aircraft may be used to better evaluate how the aircraft is currently descending, and that information may be used to predict whether the aircraft is more or less likely to intercept a boundary descent path. The FPA of an aircraft is the angle formed between the flight path of the aircraft and the horizontal, as distinguished from the pitch angle of the aircraft, which has more to do with the orientation of the aircraft itself, rather than the flight path. Returning to the illustrative example, it may be assumed that the aircraft will proceed along the FPA for a certain period of time (e.g., five seconds). A shorter or longer period of time may be assumed depending on the altitude or other predetermined considerations. Using that assumed period of time, and keeping in mind that minimum time to land 34 is based on the vertical motion of the aircraft, a vertical vector of the flight path may be calculated. In other words, if the FPA is assumed to proceed unchanged for, e.g., five seconds, multiplying that time by the sine of the FPA will show what portion of the five seconds is spent descending vertically as opposed to horizontally. This third term may then be added to the formula as an additional length of time before landing from the current altitude.

$$\text{Time to Land}_{MIN} = \left\{\frac{\text{MAX}((ALT_A - ALT_F), 0)}{VS_{MAX}} + \frac{\text{MIN}(ALT_F, ALT_A)}{\frac{ALT_F}{T_F}} + (\sin\theta \times \text{Time}_{lookahead})\right\} \quad \text{Equation 1B}$$

In Equation 1B, the first two terms are identical to those of Equation 1. The third term takes into account the FPA (θ) and calculates a vertical vector of the lookahead time (Time$_{lookahead}$). Lookahead time may be any suitable value. For example, lookahead time may be five seconds, two seconds, or a variable number based on any suitable factors. In some examples, when the aircraft is between the approach altitude and the flare height, lookahead time may be calculated based on an equation similar to Equation 1A. For example:

$$\text{Time}_{lookahead} = \left(\frac{ALT_A - ALT_F}{ALT_{Approach} - ALT_F}\right) \times (\text{Time}_{Approach} - \text{Time}_F) + \text{Time}_F \quad \text{Equation 1C}$$

Here, the lookahead time (Time$_{lookahead}$) varies continuously within a range bounded by two constants: a lookahead time at the approach altitude (Time$_{Approach}$), e.g., five seconds, and a lookahead time at the flare altitude (Time$_F$), e.g., two seconds. As shown in Equation 1C, and similar to Equation 1A, the lookahead time in this embodiment varies as a sort of interpolation based on the altitude of the aircraft within the approach-to-flare window. Below flare altitude, the lookahead time may vary or may be constant. For example, lookahead time may remain constant at Time$_F$.

The time for the aircraft to reach a given target LTD point may be calculated using the following equation.

$$\text{Time to Target } LTD \text{ Point} = \left\{ \frac{\text{Distance to Target } LTD \text{ Point}}{\text{Ground Speed}_A} \right\} \quad \text{Equation 2}$$

Here, the time to a given LTD point may be determined by dividing the distance to that LTD point from geographical position 20 of the aircraft by the current ground speed of the aircraft (Ground Speed$_A$). This is a simple (time=distance/velocity) equation. Times may be calculated for multiple LTD points of interest. For example a time may be calculated corresponding to time 30 to reach planned LTD point and/or time 32 to reach maximum braking LTD point, among others.

As described above, other information may be used to further enhance or refine the value determined in Equation 2. As explained, FPA 8 may be used to analyze the situation based on the present angle of descent of the aircraft. Because time to target LTD point is determined based on horizontal distance, a horizontal vector of the lookahead time may be calculated and taken into account in the formula. For example, a refined version of Equation 2 could include the following.

$$\text{Time to Target } LTD \text{ Point} = \quad \text{Equation 2A}$$
$$\left\{ \frac{\text{Distance to Target } LTD \text{ Point}}{\text{Ground Speed}_A} + (\cos\theta \times \text{Time}_{lookahead}) \right\}$$

In Equation 2A, the term is identical to that of Equation 2. The second term takes into account the FPA ($\theta$) and calculates a horizontal vector of the lookahead time (Time$_{lookahead}$). Lookahead time may be any suitable value. For example, lookahead time may be five seconds. The same lookahead time must be used for Equations 1B and 2A, because the two resulting values will be compared directly in a later step.

Once these values are determined, the times may be compared, as shown in the equations below. Note that reference may be made to Equation 1 and Equation 2, but Equations 1B and 2A may be used instead depending on design preference. It should also be understood that Equation 1 is intended to be used with Equation 2, and Equation 1B is intended to be used with Equation 2A.

Time to Land$_{MIN}$≤Time to Target LTD Point      Equation 3

Time to Land$_{MIN}$≤(Time to Target LTD Point−Margin)      Equation 4

Step 116 includes making the comparison of Equation 3 using maximum braking LTD point 28 as the target LTD point. If minimum time to land 34 is greater than time 32 to reach maximum braking LTD point, then step 118 includes alerting the operator. This alert may take the form of a visual and aural warning, and/or may include warning and exhortatory phrases such as "Runway too short" and/or "Pull Up."

Step 120 includes making the comparison of Equation 4 using maximum braking LTD point 28 as the target LTD point, and including a predetermined margin time. In other words, the minimum time to land is within a certain margin of the time to target LTD point. This may be done, for example, to allow an operator time to take corrective action before the actual unsafe condition exists. Accordingly, any suitable margin may be used. For example, a five- to ten-second margin may be used. If minimum time to land 34 is within the margin (e.g. five seconds) of time 32 to reach maximum braking LTD point 28, then step 122 includes determining if the system requires a cautionary alert based on this condition. For example, if a cautionary alert is already being provided due to another condition such as described below in step 126, no further action may be necessary. On the other hand, if a cautionary alert is needed and not already provided, step 124 includes providing a caution-level alert to the operator. For example, visual and/or aural cautions may be presented, which may include phrases such as "Caution Short Runway" and/or "Short Runway."

Step 126 includes making the comparison of Equation 3 using planned LTD point 26 as the target LTD point. If minimum time to land 34 is greater than time 30 to reach planned LTD point, then step 124 (described above) includes alerting the operator.

Step 128 includes making the comparison of Equation 4 using planned LTD point 26 as the target LTD point, and again including a predetermined margin time. As described above, any suitable margin may be used. For example, a five- to ten-second margin may be used. If minimum time to land 34 is within the margin (e.g. five seconds) of time 30 to reach planned LTD point 26, then step 130 includes providing an advisory alert to the operator. For example, visual and/or aural advisories may be presented, which may include phrases such as "Long Landing."

These steps may be repeated, dynamically updating data on each loop or as desired. For example, altitude, landing performance, and/or maximum desired descent rate may be updated periodically (e.g. once per second). Accordingly, referring back to FIG. 1, the LTD points 26 and 28 may move toward and away from the end of the runway as landing performance 22 and 24 are updated, and the slope of one or more curves 36 may change dynamically depending on conditions. Step 112 may be repeated each cycle, and the process may be shut down or inhibited once it is determined that the aircraft is on the ground.

Example 3

This example describes an illustrative landing alert system 200 suitable for carrying out method 100, and relationships between various illustrative components; see FIG. 3.

In this example, system 200 includes a multi-purpose control and display unit (MCDU) 202, a flight management computer (FMC) 204, a TAWS computer 206, an air data inertial reference unit (ADIRU) 208, a display 210, and a flight deck audio system 212.

An operator may enter information via MCDU 202 for use by FMC 204, and accordingly MCDU 202 will be in communication with FMC 204. For example, an operator may enter data such as runway conditions, autobrake settings, thrust reverser usage, and/or the like. These data points may be utilized by the FMC to calculate stopping distance (landing performance). In some examples, landing performance is instead determined by the operator and entered directly. The operator may also enter other data such as airspeed correction values. MCDU 202 may include any suitable user interface capable of communicating information to the FMC.

FMC 204 may include a typical flight management computer or system, and may include any suitable calculator configured to determine landing performance based on factors input by the operator and/or other sensors and/or components. FMC 204 may provide the landing performance values to TAWS 206.

TAWS 206 may include any suitable terrain awareness and warning system. For example, TAWS 206 may include an enhanced ground proximity warning system (EGPWS). TAWS 206 may be configured to receive landing performance data from the FMC as well as environmental and other data from the ADIRU such as ground speed, FPA, and wind information. TAWS 206 may then calculate the alerting envelope, i.e., the various calculated values described above that determine when and if an alert is warranted. Once an alert is determined to be necessary, TAWS may communicate that alert to the operator via visual display system 210, such as a primary flight display (PFD) or head-up display (HUD), and/or via audio system 212.

Example 4

This example describes a display 300 suitable for use with a landing alert system as described in Examples 1 through 3; see FIGS. 4A-4C.

Similar to display 210 described briefly above, one or more alerts may be presented to the operator through a visual display unit such as display 300. Display 300 may be a modified version of a typical glide slope display familiar to pilots.

Display 300 may include a screen 302, on which are an actual glide path marker 304, a plurality of regularly spaced dots 306 above and below marker 304, a glide slope pointer 308 indicating the desired glide slope, and one or more alert markers such as caution marker 310 and warning marker 312.

Actual glide path marker 304 indicates the actual glide path of the aircraft as viewed in the direction of travel, and is therefore fixed relative to screen 302, which is fixed relative to the aircraft. Dots 306 are fixed and regularly spaced to provide an indication of variance from the central marker (304). Marker 304 and dots 306 do not move on screen 302, but rather provide a frame of reference with respect to the aircraft, on which other information may be superimposed.

Glide slope pointer 308, shown here as a diamond shaped icon, visually indicates the location of a desired glide path relative to the actual path of the aircraft. For example, when pointer 308 is below marker 304 as shown in FIG. 4B, this indicates to the operator that a correction is needed, such as bringing the nose of the aircraft down, such that the actual glide path comes down to meet the desired glide path. After that action is taken, pointer 308 may be superimposed over marker 304 as shown in FIG. 4A. If the action is continued, pointer 308 may continue to rise, indicating that the aircraft is now below the desired glide path.

Similarly, markers 310 and 312 may "float" on the display. Rather than indicating a proximity to the desired glide path, these alerts may indicate a proximity to one of the curves 36 shown in FIG. 1. In other words, if caution marker 310 approaches path marker 304, as shown in FIG. 4C, that indicates that the aircraft is approaching, for example, boundary path 46. Likewise, if caution marker 310 passes below path marker 304 and warning marker 312 approaches the center, then the aircraft is within the margin and is approaching, for example, boundary path 42. Other visual and/or aural alerts may accompany each condition.

Example 5

This example describes a data processing system 900 in accordance with aspects of the present disclosure. In this example, data processing system 900 is an illustrative data processing system for implementing system 10 in FIG. 1, method 100 in FIG. 2, and/or portions of system 200 in FIG. 3; See FIG. 5.

In this illustrative example, data processing system 900 includes communications framework 902. Communications framework 902 provides communications between processor unit 904, memory 906, persistent storage 908, communications unit 910, input/output (I/O) unit 912, and display 914. Memory 906, persistent storage 908, communications unit 910, input/output (I/O) unit 912, and display 914 are examples of resources accessible by processor unit 904 via communications framework 902.

Processor unit 904 serves to run instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and other suitable information either on a temporary basis or a permanent basis.

Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output (I/O) unit 912 allows for input and output of data with other devices that may be connected to data processing system 900. For example, input/output (I/O) unit 912 may provide a connection for user input through a keyboard, a mouse, and/or some other suitable input device. Further, input/output (I/O) unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to and/or in place of those illustrated for data processing system 900. Other components shown in FIG. 9 can be varied from the illustrative examples shown. The different embodiments may be implemented using any hardware device or system capable of running program code. As one example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASTC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or both transmit and receive data. Communications unit 910 may be, for example, a modem or a network adapter, two network adapters, or some combination thereof. Further, a memory may be, for example, memory 906, or a cache, such as that found in an interface and memory controller hub that may be present in communications framework 902.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 6

This section describes additional aspects and features of landing alert systems, presented without limitation as a series of numbered paragraphs. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A method, implemented in a computer system, of assisting with landing of an aircraft, the method comprising determining, during an approach of an aircraft to landing on a runway, a target touchdown point on the runway, the target touchdown point being calculated to permit stopping of the aircraft before reaching an end of the runway, determining a boundary descent path configured to permit safe approach and touchdown of the aircraft on the runway at or before the target touchdown point, and in response to the aircraft crossing within a selected margin of the boundary path, alerting an operator of the aircraft.

B. The method of paragraph A, wherein the target touchdown point is calculated to be the latest touchdown point on the runway which will permit safe landing and stopping of the aircraft using maximum deceleration capability.

C. The method of paragraph A, wherein the target touchdown point is calculated to be the latest touchdown point on the runway which will permit safe landing and stopping of the aircraft using a planned deceleration less than maximum deceleration capability.

D. The method of paragraph A, wherein the selected margin is a nonzero period of time, and alerting the operator includes providing a cautionary or advisory alert.

E. The method of paragraph A, wherein the boundary descent path corresponds to a maximum allowable descent rate of the aircraft.

F. The method of paragraph E, wherein the maximum allowable descent rate of the aircraft varies depending on altitude.

G. The method of paragraph A, wherein the target touchdown point calculation is dynamically updated at predetermined intervals.

H. The method of paragraph A, wherein the boundary descent path is dynamically updated at predetermined intervals.

I. The method of paragraph A, wherein a proximity to the boundary descent path is determined at least in part by analyzing a current flight path angle of the aircraft.

J. A method of assisting with landing of an aircraft, the method comprising determining, during an approach of an aircraft to landing on a runway, a latest touchdown point on the runway based on aircraft characteristics and current landing conditions, the latest touchdown point being calculated to permit stopping of the aircraft before reaching an end of the runway, comparing, by a computer processor, an estimated minimum time (T1) to land the aircraft versus an estimated time (T2) to reach the latest touchdown point, and alerting an operator of the aircraft when T1 is projected to be within a specified margin of T2.

K. The method of paragraph J, wherein T2 is estimated using a current ground speed of the aircraft.

L. The method of paragraph J, wherein T1 is estimated using a maximum allowable descent rate.

M. The method of paragraph J, wherein the alerting step includes providing an alert signal when T1 is projected to be greater than T2.

N. The method of paragraph J, wherein the determining step includes assuming a planned deceleration on the runway less than a maximum deceleration of the aircraft.

O. The method of paragraph J, further comprising receiving one or more of the following inputs: (a) runway conditions, (b) autobrake setting, (c) thrust reversers usage, (d) landing performance calculation, and (e) airspeed correction values.

P. The method of paragraph J, further comprising displaying an alert indication on a glide slope indicator.

Q. The method of paragraph J, wherein T1 is estimated using a current flight path angle of the aircraft.

R. A computer system for assisting with landing of an aircraft, the computer system comprising a processor; a memory in communication with the processor; and a landing alert program including a plurality of instructions stored in the memory that are executed by the processor to: determine, during an approach of an aircraft to landing on a runway, a latest touchdown point on the runway, the latest touchdown point being calculated to permit stopping of the aircraft before reaching an end of the runway, compare an estimated minimum time (T1) to land the aircraft versus an estimated time (T2) to reach the latest touchdown point, and alert an operator of the aircraft when T1 is projected to be within a specified margin of T2.

S. The system of paragraph R, wherein the instructions are further executed to update T1 and T2 dynamically at selected intervals.

T. The system of paragraph R, further comprising a display in communication with the processor, the display configured to indicate visually an alert based on a relationship between T1 and T2.

Advantages, Features, Benefits

The different embodiments of the landing alert system for preventing runway excursions described herein provide several advantages over known solutions. For example, the illustrative embodiments of a landing alert system described herein allow actual runway conditions and other real time factors to be accounted for in a dynamic fashion. Additionally, and among other benefits, illustrative embodiments of the landing alert system described herein allow alerting of an operator based on proximity to an intuitive boundary descent path, and a visual display of the same information incorporated into a familiar display. No known system or device can perform these functions, particularly utilizing existing computer systems typically present, for example, in commercial aircraft. Thus, the illustrative embodiments described herein are particularly useful for assisting with the landing of commercial aircraft. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

I claim:

1. A method, implemented in a computer system, of assisting with landing of an aircraft, the method comprising:
   determining, based on one or more current runway conditions during an approach of an aircraft to landing on a runway, a latest touchdown point on the runway, the latest touchdown point being calculated to permit stopping of the aircraft before reaching an end of the runway;
   determining a boundary descent path derived from a maximum allowable descent rate of the aircraft, the boundary descent path terminating at the latest touchdown point, such that the boundary descent path is configured to permit safe approach and touchdown of the aircraft on the runway at or before the latest touchdown point; and
   in response to the aircraft crossing within a selected margin of the boundary descent path, alerting an operator of the aircraft;
   wherein the latest touchdown point is calculated to be the latest touchdown point on the runway which will permit safe landing and stopping of the aircraft using maximum deceleration capability.

2. A method, implemented in a computer system, of assisting with landing of an aircraft, the method comprising:
   determining, based on one or more current runway conditions during an approach of an aircraft to landing on a runway, a latest touchdown point on the runway, the latest touchdown point being calculated to permit stopping of the aircraft before reaching an end of the runway,
   determining a boundary descent path derived from a maximum allowable descent rate of the aircraft and terminating at the latest touchdown point, such that the boundary descent path is configured to permit safe approach and touchdown of the aircraft on the runway at or before the latest touchdown point, and
   in response to the aircraft crossing within a selected margin of the boundary descent path, alerting an operator of the aircraft;
   wherein the latest touchdown point is calculated to be the latest touchdown point on the runway which will permit safe landing and stopping of the aircraft using a planned deceleration less than maximum deceleration capability.

3. The method of claim 1, wherein the selected margin is a nonzero period of time, and alerting the operator includes providing a cautionary or an advisory alert.

4. The method of claim 1, wherein the maximum allowable descent rate of the aircraft varies depending on altitude.

5. The method of claim 1, wherein the latest touchdown point calculation is dynamically updated at predetermined intervals.

6. The method of claim 1, wherein the boundary descent path is dynamically updated at predetermined intervals.

7. A method, implemented in a computer system, of assisting with landing of an aircraft, the method comprising:
   determining, based on one or more current runway conditions during an approach of an aircraft to landing on a runway, a latest touchdown point on the runway, the latest touchdown point being calculated to permit stopping of the aircraft before reaching an end of the runway,
   determining a boundary descent path derived from a maximum allowable descent rate of the aircraft and terminating at the latest touchdown point, such that the boundary descent path is configured to permit safe approach and touchdown of the aircraft on the runway at or before the latest touchdown point, and
   in response to the aircraft crossing within a selected margin of the boundary descent path, alerting an operator of the aircraft;
   wherein a proximity to the boundary descent path is determined at least in part by analyzing a current flight path angle of the aircraft.

8. A method of assisting with landing of an aircraft, the method comprising:
   determining, during an approach of an aircraft to landing on a runway, a latest touchdown point on the runway based on aircraft characteristics and current landing conditions, the latest touchdown point being calculated to permit stopping of the aircraft before reaching an end of the runway,
   comparing, by a computer processor, an estimated minimum length of time (T1) required to land the aircraft based on a current altitude of the aircraft and using a maximum allowable descent rate of the aircraft versus an estimated length of time (T2) required to reach the latest touchdown point based on a current distance to the latest touchdown point, and
   alerting an operator of the aircraft when T1 is projected to be within a specified margin of T2.

9. The method of claim 8, wherein T2 is estimated using a current ground speed of the aircraft.

10. The method of claim 8, wherein the alerting step includes providing an alert signal when T1 is projected to be greater than T2.

11. The method of claim 8, wherein the determining step includes assuming a planned deceleration on the runway less than a maximum deceleration of the aircraft.

12. The method of claim 8, further comprising receiving one or more of the following inputs: (a) runway conditions, (b) autobrake setting, (c) thrust reversers usage, (d) landing performance calculation, and (e) airspeed correction values.

13. The method of claim 8, further comprising displaying an alert indication on a glide slope indicator.

14. The method of claim 8, wherein T1 is estimated using a current flight path angle of the aircraft.

15. A computer system for assisting with landing of an aircraft, the computer system comprising:
   a processor;
   a memory in communication with the processor; and
   a landing alert program including a plurality of instructions stored in the memory that are executed by the processor to:
     determine, during an approach of an aircraft to landing on a runway, a latest touchdown point on the runway, the latest touchdown point being calculated to permit stopping of the aircraft before reaching an end of the runway,
     compare an estimated minimum length of time (T1) required to land the aircraft based on a current altitude of the aircraft and using a maximum allowable descent rate of the aircraft versus an estimated length of time (T2) required to reach the latest touchdown point based on a current distance to the latest touchdown point, and
     alert an operator of the aircraft when T1 is projected to be within a specified margin of T2.

16. The system of claim 15, wherein the instructions are further executed to update T1 and T2 dynamically at selected intervals.

17. The system of claim 15, further comprising:
a display in communication with the processor, the display configured to indicate visually an alert based on a relationship between T1 and T2.

18. The method of claim 1, wherein a proximity to the boundary descent path is determined at least in part by analyzing a current flight path angle of the aircraft.

19. The method of claim 2, wherein the selected margin is a nonzero period of time, and alerting the operator includes providing a cautionary or an advisory alert.

20. The method of claim 2, wherein the boundary descent path corresponds to a maximum allowable descent rate of the aircraft.

21. The method of claim 20, wherein the maximum allowable descent rate of the aircraft varies depending on altitude.

22. The method of claim 2, wherein the latest touchdown point calculation is dynamically updated at predetermined intervals.

23. The method of claim 2, wherein the boundary descent path is dynamically updated at predetermined intervals.

24. The method of claim 2, wherein a proximity to the boundary descent path is determined at least in part by analyzing a current flight path angle of the aircraft.

25. The method of claim 7, wherein the latest touchdown point is calculated to be the latest touchdown point on the runway which will permit safe landing and stopping of the aircraft using maximum deceleration capability.

26. The method of claim 7, wherein the latest touchdown point is calculated to be the latest touchdown point on the runway which will permit safe landing and stopping of the aircraft using a planned deceleration less than maximum deceleration capability.

27. The method of claim 7, wherein the selected margin is a nonzero period of time, and alerting the operator includes providing a cautionary or an advisory alert.

28. The method of claim 7, wherein the maximum allowable descent rate of the aircraft varies depending on altitude.

29. The method of claim 7, wherein the latest touchdown point calculation is dynamically updated at predetermined intervals.

30. The method of claim 7, wherein the boundary descent path is dynamically updated at predetermined intervals.

* * * * *